United States Patent Office

3,564,494
Patented Feb. 16, 1971

3,564,494
FAN FILTERING SEISMIC DATA
Clint W. Frasier, Cambridge, Mass., and John L. Shanks and Sven Treitel, Tulsa, Okla., assignors to Pan American Petroleum Corporation, Tulsa, Okla., a corporation of Delaware
Filed Sept. 27, 1966, Ser. No. 582,389
Int. Cl. G01u 1/28
U.S. Cl. 340—15.5      1 Claim

ABSTRACT OF THE DISCLOSURE

In fan filtering seismic data traces to discriminate for or against certain arrivals on the basis of their apparent moveout across an array of traces, the requirement for applying different time-domain filters to the different traces during the filtering operation is avoided by first applying a set of specific weighting factors and time delays to the traces, followed by summing with the proper polarities. Passing the summation trace through a particular single time-domain filter gives the same output as the more complex process using a different time-domain filter for each two traces of the array. Fan-rejection filtering is also possible.

---

This invention relates to seismic geophysical surveying and is directed particularly to the filtering of seismic data by the process variously known as fan filtering, velocity filtering, or "Pie Slicing," a service-mark name. More specifically, the invention is directed to an improvement in the fan filtering of seismic data wherein the required filtering of all traces being processed to give one output trace is accomplished simultaneously with a single time-domain filter, rather than separately filtering the traces with a number of different filters proportional to the number of combined traces.

The fan filtering of seismic data is well described by Embree, Burg, and Backus in Geophysics, Vol. XXVIII, (December 1963), pp. 948–974. Briefly, fan filtering is a process which utilizes a plurality of recorded seismic traces, respectively representing a corresponding plurality of successive subsurface reflection or sampling points along a seismic profile line, to discriminate for or against events primarily only on the basis of their apparent dip or move-out across the plurality of traces. As compared with other forms of dip or move-out discrimination, such as trace composing with time delays, fan filtering does little or nothing in the usual sense of frequency filtering. That is, certain dipping events on a record cross-section or display are rejected regardless of their apparent frequency spectrum, while other dipping events are passed and retain essentially their original "character."

One limitation on the use of fan filtering has been that it is somewhat expensive in terms of data-handling or processing costs. To a large extent this is due to the fact that, in using a given number or array of traces to produce a fan-filtered output trace, a different time-domain filter has been applied to each trace, depending on its separation or distance from the center of the trace array taken as a reference point, before summation with the other differently filtered traces of the array. By using an even number of traces and a uniform sample-point spacing in the filter array, and by choosing the reference point at the array center, the required number of individual-trace filters can be cut in half; but a conventional fan-filtering operation in which each output trace is derived from twelve input traces, for example, still requires six different time-domain filters, one of the two traces at each of the six different distances from the center reference point.

Stated most briefly, we have discovered that this time-domain filter requirement can be reduced to a single time-domain filter, regardless of the number of traces in the array which produces each output trace. Instead of simultaneously filtering an even number of traces through half as many different filters and summing the filter outputs to produce each fan-filtered trace, we have found that, by sampling the various traces with proper time delays, amplitudes, and polarities, summing all of the trace samples, and filtering the resultant summation by a single time-domain filter, the output trace so produced is identical to the prior-art fan-filtered trace.

This means that only the number of amplitude-adjusting means (attenuators) and of time delays (delay lines) varies when the trace-array size changes. As compared with time-domain filtering, attenuation and time delay are relatively simple and inexpensive to provide, in either an analog or a digital-computer type of operation. Thus, if it is desired to utilize a quite large array of traces for increased discrimination, this can be done in accordance with our invention without adding greatly to the cost of equipment or of record processing.

This will be better understood by reference to the accompanying drawings forming a part of this application and showing diagrammatically an analog form of our invention. In these drawings, FIG. 1 is a diagrammatic cross section of the earth along a seismic profile line;

Figure 1:
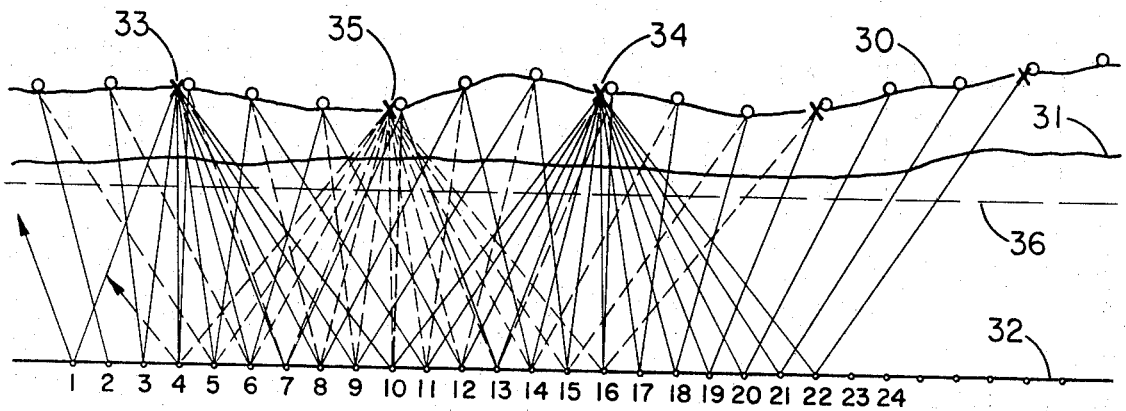

Referring now to these drawings in detail and particularly to FIG. 1 thereof, this figure represents in highly diagrammatic form an earth cross section along a seismic survey line or profile. Thus, along a line 30 representing the earth's surface is laid out a pattern of seismometers, represented by small o's and shot points represented as x's. The elevation of surface 30 may vary along the profile line as shown, while the base of the weathered layer at interface 31 may also vary in depth or elevation in some unknown manner. Some of the ray paths involved in reflections from a subsurface interface 32 are shown, those emanating from shot points 33 and 34 being shown in solid lines, while those from shot point 35 are shown dotted for easier visability. The points along reflecting interface 32 numbered 1 to 24 represent apparent reflection points for the energy transmitted from the various shot points and received at the various seismometers, and it may be noted that each numbered reflection point has at least two ray paths associated with it, assuming that the pattern of shooting at shot points 33, 35 and 34 is continued throughout the profile line, both that part shown in FIG. 1 and those parts (not shown) beyond the end of the figure. Thus, this pattern represents twofold subsurface coverage, as a typical example of multifold subsurface profiling; but it will be apparent that the invention is applicable to seismic-trace data of any form used for making cross-section displays without regard to whether single or multifold subsurface coverage is achieved.

While the particular arrangements of shot points and seismometers along surface 30 affect the recorded data in a number of ways, they are only indirectly involved in fan filtering of the data. That is, a level reference datum such as the dashed line 36 is typically chosen, and the recorded traces are corrected to this datum for variations in elevation of the surface 30, for variations in the weathering thickness between surface 30 and boundary 31, and for the effect of horizontal distance between the shot point and the seismometer for each recorded trace. Further, two or more traces having a common subsurface reflection point on the interface 32 may be added together or composited into a single resultant trace. As specific techniques for making these static and dynamic corrections of the seismic traces and for compositing them when appropriate are well known to geophysicists, no further detailed description is deemed necessary here.

Figure 2:
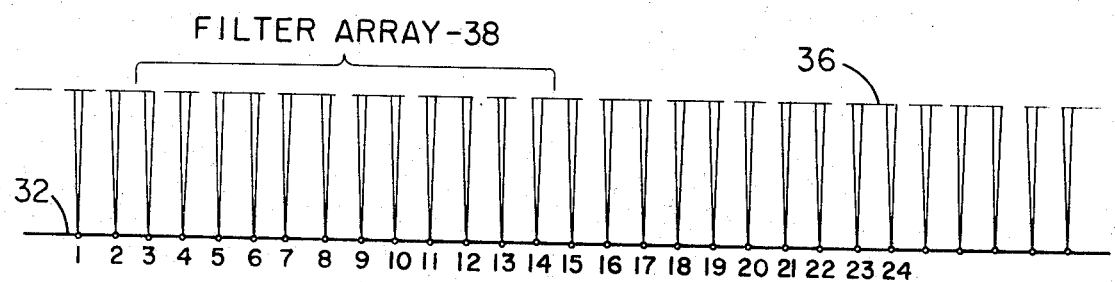
FIG. 2 is a diagram illustrating the meaning of the term "corrected traces" with reference to FIG. 1.

FIG. 2 shows diagrammatically how the data obtained in FIG. 1 may be displayed after correction. That is, static time differences and different path angularities are considered to have been eliminated, so that each one of the numbered reflection points 1–24 can be shown as having one essentially vertical travel path between the datum 36 and the interface 32. The positions and spacing of the numbered reflection points 1–24 in FIG. 2 are the same as their positions and spacing in FIG. 1, but the actual positions of shot points and detectors on surface 30 are disregarded. It is to such corrected traces as are represented in FIG. 2 that fan filtering is applicable.

Before explaining our invention in detail, we shall first show how our mathematical expression of it is derived from the prior art. On page 973 of the above-mentioned Geophysics reference, the impulse response of the time-domain filter function required to be applied to each trace, prior to including it in the summation, is given as the reference Equation 5 as follows:

$$y(T_n, X_m) = \frac{1}{\pi^2 \left[ \left( \frac{X_m}{\Delta x} \right)^2 - n^2 \right]}$$

Here $\Delta x$ is the separation of the sampling points in space and thus corresponds to the spacing between the corrected traces shown in FIG. 2 above. $X_m$ is the distance of the $m$th sampling point or record trace from the center of an even number of elements forming the trace array to provide one fan-filtered trace. $T_n = n\Delta t$ is the time delay, positive or negative, of the $n$th sample point in the time-domain filter impulse response, relative to a reference time for the impulse response.

The example of the reference is a twelve-trace fan-filtering array, and we shall utilize the same form of example. Choosing as our filter array 38 the twelve traces numbered 3–14, inclusive, FIG. 2, these sampling points have been shown on an expanded scale in FIG. 3, the top line of which gives the trace number above the sample-point position shown as a black dot. For this twelve-trace array, the center reference position is the line 39 midway between traces (or sample-point positions) 8 and 9. $X_m$ of the Geophysics paper is thus the distance from this reference position 39, and the $\Delta x$ of Geophysics is the spacing between any two of the sample points. The values of $m$ utilized in Geophysics are shown immediately above each sample point.

The six time-domain filter impulse functions required for the twelve-trace filtering array of the Geophysics paper, computed using the above expression, are shown as FIG. 21 on page 972 of Geophysics. These are graphical representations of the data of Table 2 on Geophysics page 974. It is the essence of our invention that we can accomplish the same fan-filtering result as these six time-domain filters provide, using only a single time-domain filter.

It may be noted that in the expression for the Geophysics time-domain filters, $X_m$ and $\Delta x$ appear only as the ratio $X_m/\Delta x$. It will be helpful in the derivation to follow to use a new trace-position variable, with respect to reference 39, $\mu$ related to the ratio $X_m/\Delta x$ as follows:

$$\frac{\mu}{2} = \frac{X_m}{\Delta x} \quad (1)$$

Figure 3:
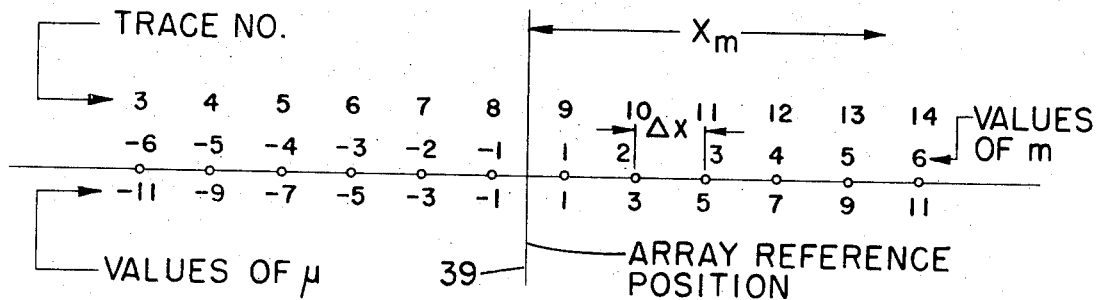
FIG. 3 is a diagram showing the relationship of certain symbols used in explaining our invention.

Thus, the various values of $\mu$ designating sample-point positions relative to reference 39 are shown immediately under the sample points in FIG. 3, and are thus whole odd integers increasing with sample-point distance from the reference 39 as $\pm 1$, $\pm 3$, $\pm 5$, and so on. In keeping with this change in notation the $n$th time sample of the fan-filter impulse response or operator $y(T_n, X_m)$ will henceforth be designated as $y_n^\mu$. Accordingly, in this changed notation the equation for the fan-filter operator may be written as $$y_n^\mu = \frac{1}{\pi^2 \left[ \left( \frac{\mu}{2} \right)^2 - n^2 \right]} \quad (2)$$

Letting the $n$th time sample of the input trace associated with the trace or sample-position index $\mu$ be designated as $v_n^\mu$, then the output of the fan-filtering process, in digital notation, is a trace $h_n$ computed from the fan-filtering equation $$h_n = \sum_{\mu=-l}^{+l} v_n^\mu * y_n^\mu \quad (3)$$

In this expression $l$ is an odd integer related to the number of traces used in the trace array for each fan-filtering operation. The number of traces is $l+1$, so that for a twelve-trace fan-filtering array $l=11$, and it may thus be considered as representing the limiting value of $\mu$. The asterisk (*) is the symbol denoting digital convolution of two time series; for example, $$v_n^\mu * y_n^\mu = \sum_{\tau=-\infty}^{+\infty} y_\tau^\mu v_{n-\tau}^\mu$$

The above equation for the fan-filter operators may be expanded in partial fractions to give $$y_n^\mu = \frac{1}{\pi^2 \mu} \left[ \frac{1}{\frac{\mu}{2} - n} + \frac{1}{\frac{\mu}{2} + n} \right] \quad (4)$$

If we designate the individual operators of this equation as $$r_n^\mu = \frac{1}{\frac{\mu}{2} - n} \quad \text{and} \quad q_n^\mu = \frac{1}{\frac{\mu}{2} + n} \quad (5), (6)$$

the equation for the filter operator can be written as $$y_n^\mu = \frac{1}{\pi^2 \mu} [r_n^\mu + q_n^\mu] \quad (7)$$

Now it can be proven that $$r_n^\mu = r^1_{n - \frac{1}{2}(\mu - 1)} \quad (8)$$

and that $$q_n^\mu = -r^1_{n + \frac{1}{2}(\mu + 1)} \quad (9)$$

so that the filter-operator function can be written as $$y_n^\mu = \frac{1}{\pi^2 \mu} \left[ r^1_{n - \frac{1}{2}(\mu - 1)} - r^1_{n + \frac{1}{2}(\mu + 1)} \right] \quad (10)$$

Substituting this into the equation for the fan-filtering process, the fan-filter output trace expression becomes $$h_n = \sum_{\mu=-l}^{+l} v_n^\mu * \frac{1}{\pi^2 \mu} \left[ r^1_{n - \frac{1}{2}(\mu - 1)} - r^1_{n + \frac{1}{2}(\mu + 1)} \right] \quad (11)$$

which may be rewritten as $$h_n = \frac{1}{\pi^2} \sum_{\mu=-l}^{+l} \frac{1}{\mu} \left[ v_n^\mu * r^1_{n - \frac{1}{2}(\mu - 1)} - v_n^\mu * r^1_{n + \frac{1}{2}(\mu + 1)} \right] \quad (12)$$

Now, since convolution is commutative and distributive, $$v_n^\mu * r^1_{n - \frac{1}{2}(\mu - 1)} = v^\mu * r_n^1_{n - \frac{1}{2}(\mu - 1)} \quad (13)$$

lay-time values corresponding to $\mu$ for the particular trace pairs, traces 3–14 are simultaneously reproduced, attenuated, and sampled with the specified time delays of Equation 15 summed by circuits 58 and 59, subtracted at point 61, filtered by filter 62, and recorded as a trace on drum 65 by element 64. As is apparent on the drawing, the time separation in units of sampling time of the delay line taps is set to the value of $\mu$ for the corresponding trace pair. As is explained in the Geophysics paper, this provides the narrowest filter fan or moveout-per-trace discrimination. In order to pass a greater range of moveouts per trace, the output taps on delay lines 55a–55f may be spread further apart with respect to the zero delay reference line 66.

With playback heads 52 aligned as shown, in a straight line parallel to the axis of drum 50, the fan-filter discrimination is for events with zero moveout or dip, corresponding to horizontal reflecting interfaces. If it is desired to discriminate other events with finite moveouts or dip across a data display, this can be done by shifting playback heads 52 into the proper angular orientation with respect to traces 3–14 on drum 50 to introduce compensating time delays that bring the dipping events into time coincidence. The resulting signals will then be properly fan filtered by the apparatus of FIG. 4 with the delay-line taps set in the zero-moveout positions shown on the drawing with respect to zero-delay reference 66. Likewise, events with non-linear or curved moveout patterns can be discriminated by setting heads 52 in a curved pattern that brings these events into time coincidence during playback.

Figure 4:
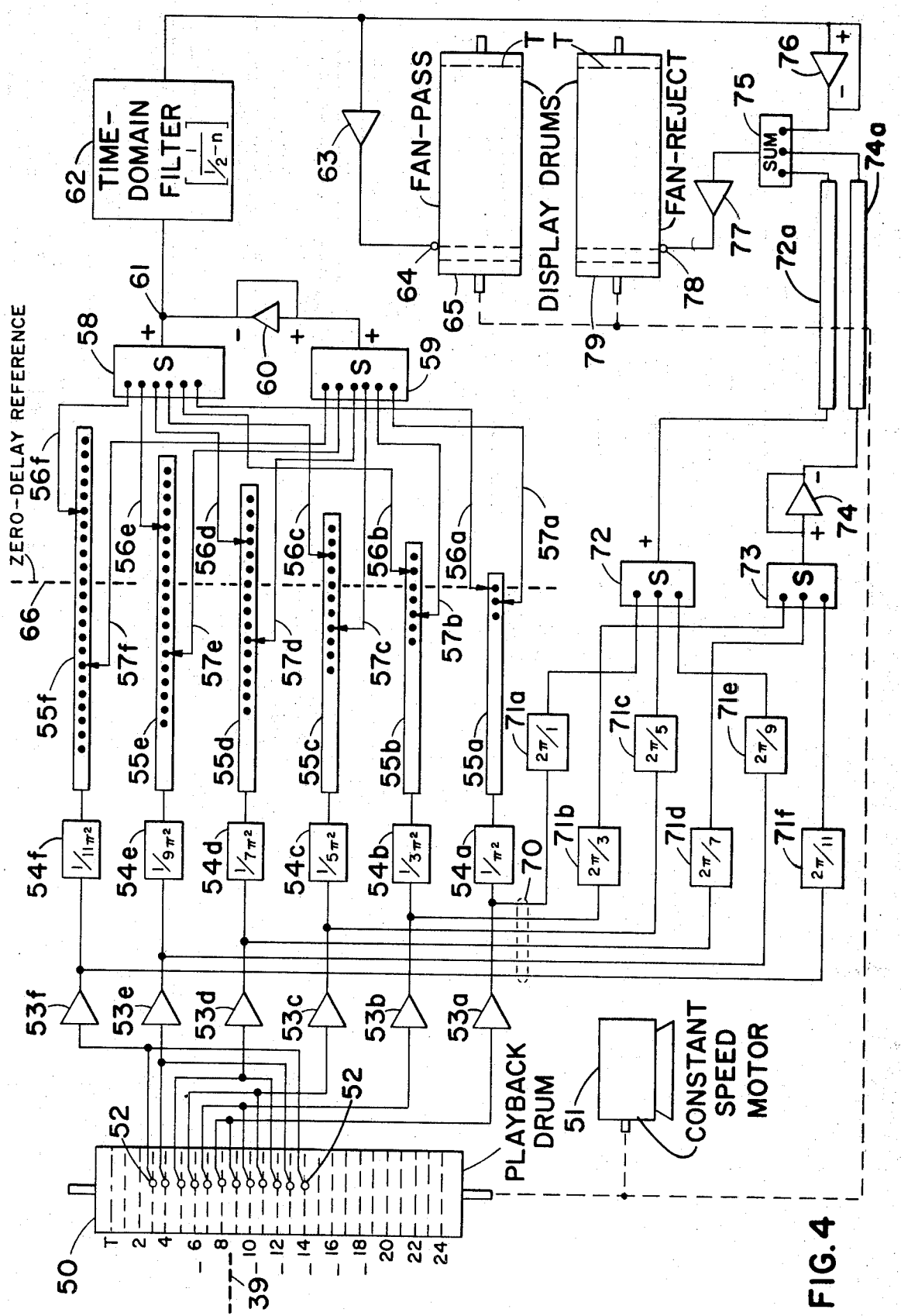
FIG. 4 is a schematic wiring diagram of an analog form of our invention.

The apparatus portion of FIG. 4 so far described corresponds to a fan-pass filtering operation as defined by Equation 15. The inverse operation of fan rejection can be performed at the same time by the additional apparatus shown in the lower portion of FIG. 4. Thus, the respective outputs of playback amplifiers 53a–53f are connected by individual ones of the leads 70 to the respective calibrated attenuators 71a–71f. Inspection of the summation term of Equation 17 will show that its polarity alternates between plus and minus as determined by the expression $$(-1)^{\frac{|\mu|+3}{2}}$$

Corresponding to the plus terms, for values of $\mu=1, 5,$ and 9, the outputs of calibrated attenuators 71a, 71c and 71e are connected to a summation circuit 72, while the terms having negative values, corresponding to $\mu=3, 7,$ and 11, are represented by the outputs of attenuators 71b, 71d, and 71f connected to summation circuit 73, which has its output inverted by inverting amplifier 74. After equal delays by delay lines 72a and 74a, the combined outputs of summation circuit 72 and of amplifier 74 represent, at the input of summation circuit 75, the entire summation term on the right hand side of Equation 17. The output of time-domain filter 62, as inverted by an inverting amplifier 76, is applied to the third input terminal of summation circuit 75, so that the output of this circuit, as transmitted through a recording amplifier 77 to a recording element 78 produces a display trace on the drum 79, representing the entire right-hand side of Equation 17. Like drum 65, fan-reject display drum 79 is driven in synchronism with reproducing drum 50 by the motor 51.

The operation of this portion of FIG. 4 is believed apparent and may be briefly summarized as, simultaneously with the fan-pass filtering operation, taking the amplified trace-pair outputs going to the fan-pass filtering section of FIG. 4, modifying them by the calibrated attenuators 71a–71f, summing with the proper polarity and time delay, as provided by inverting amplifier 74, summation circuits 72 and 73, and delays 72a and 74a, and combining the result with the inverted fan-pass filter output provided by inverting amplifier 76. The amount of delay introduced by delay lines 72a and 74a is exactly equal to that occurring in delay lines 55a–55f between their inputs and the zero-reference delay time 66, so that all inputs to summation circuit 75 undergo the same constant delay in processing from playback drum 50 to display drums 65 and 79. Thus, the display traces produced by recording elements 64 and 78 correspond respectively to displays of all events having a given dip and of all events having dips other than the given dip.

The operation thus far described is that involved in producing a single fan-filtered output trace to be plotted on the cross-section display at a position corresponding to reference 39, midway between the sample points 8 and 9. Typically, traces 1 to 24 are filtered using twelve-trace filter arrays to produce fan-filtered output traces. The first fan-filtered trace corresponding to the use of traces 1–12 has the array mid-point between sample positions 6 and 7 as a center reference. Likewise, the other twelve-trace fan-filter arrays respectively utilize traces 5–16, 7–18, 9–20, 11–22, and 13–24. The various center-reference points of these twelve-trace filtering arrays are shown by the horizontal marks above and below mark 39 on FIG. 4, and the resulting fan-filtered traces are displayed on a cross section at these corresponding positions with respect to the numbered sampling points of FIG. 2.

Although the invention has been described by means of an analog form of apparatus, it will be apparent to those skilled in the art, as well as from the form of the mathematical equations and corresponding operations, than fan filtering can also be performed according to the invention by properly programming a digital computer. It will be apparent, therefore, that the scope of the invention should not be considered as limited to the details described, but is to be ascertained from the appended claims.

We claim:

1. The method of fan filtering seismic data recorded as a plurality reproducible traces representing a corresponding plurality of successive depth-sampling points spaced along a profile line, a point midway between two adjacent ones of said traces being chosen as a space-reference point, which method comprises, by the use of an automatic data-processing machine, the steps of simultaneously reproducing the traces of an array consisting of $l+1$ of said traces centered at said reference point, $l$ being an odd number, adjusting the relative amplitudes of said reproduced traces by a trace-position factor $1/\pi^2\mu$, where $\mu$ is an odd number having the values $\pm 1$ for the two traces nearest said reference point and increasing to the values $\pm l$ for the end traves of said array of $l+1$ traces, sampling each of said amplitude-adjusted reproduced traces at two times which are $\mu$ units of time apart, one being $\mu/2$ time units earlier and the other $\mu/2$ time units later than a common reference time for all of said array traces, separately summing said earlier and said later adjusted-amplitude trace sample values and subtracting the later-sample summation from the earlier-sample summation to produce a difference function, passing said difference function through a time-domain filter having an impulse response of the form of $$\frac{1}{\frac{1}{2}-n}$$

for values of $n$ outside of the range 0 and $+1$, recording said filtered difference function as a visible trace on a cross-section display in a position corresponding to said space-reference point, adjusting the amplitude of said reproduced traces in proportion to the factor $2\pi/\mu$, and $$v_{n\ n+\frac{1}{2}(\mu+1)}^{\mu*r^1} = v_{n+\frac{1}{2}(\mu+1)}^{\mu}{}^{*r_n^1} \quad (14)$$

so that the above fan-filter output trace can be written as $$h_n = \frac{1}{\pi^2} r_n^{1*} \sum_{\mu=-l}^{+l} \frac{1}{\mu} \left[ v_{n-\frac{1}{2}(\mu-1)}^{\mu} - v_{n+\frac{1}{2}(\mu+1)}^{\mu} \right] \quad (15)$$

where $$r_n^1 = \frac{1}{\frac{1}{2}-n} \quad (16)$$

The meaning of this expression in physical terms is simply this: fan filtering is here shown to be the result of convolving a weighted summation of different trace values with the single operator $r_n^1$, and the weighting and summation may be performed before the convolution. Each term of the summation represents the difference between the amplitude of a trace at two time points along the trace separated by $\mu$ time units and multiplied by the factor $1/\mu$.

The filtering operation thus far mathematically described is a passing filter, in the sense of transmitting all events having moveouts within the specified range of $\pm \Delta t$ time units per trace, while rejecting all other events with different moveouts per trace. The inverse operation wherein rejection rather than transmission is provided may at times also be useful. In other words, it is also desirable to provide a fan-rejection filter which is capable of removing from a display all events having a certain moveout per trace, within the specified range of $\pm \Delta t$ time units, while passing all other events.

As an example, certain types of multiple reflections can be removed by applying a pattern of moveout corrections, different from that for primary reflections, effective to cause alignment of the multiples. They can then be removed from the corrected traces by a fan-rejection filtering operation, and the resulting traces, after further shifting to bring them into the proper relationship for correction of primary-reflection moveouts, can then be displayed free of the multiple reflections.

By a mathematical derivation analgous to that for the fan-pass filter above, it can be shown that the fan-rejection filter $g_n$ is defined by the following expression:

$$g_n = -h_n + \sum_{\mu=-l}^{+l} v_n^{\mu} \left[ \frac{2\pi}{|\mu|} (-1)^{\frac{|\mu|+3}{2}} \right] \quad (17)$$

Analysis of this expression reveals that the rejection filter is simply the negative of the pass filter plus the sum of weighted values of the original traces, each with an appropriate polarity and weight depending on its position in the filter-trace array. Hence, once the fan-passing filter operation has been performed, it is a simple matter to perform a fan-rejection filtering operation either on a digital computer or by an analog device.

In FIG. 4 is shown diagrammatically an analog apparatus for performing fan filtering in accordance with out invention. It is assumed that the corrected traces 1–24 are available for playback on a magnetic drum 50 rotated at constant speed by a suitable drive connection to a motor 51. Drum 50 may also carry a timing trace T. Positioned respectively opposite traces 3 to 14 constituting the assumed twelve-trace filter array 38, is a bank of reproducing magnetic heads 52, each reproducing a respective one of the twelve-trace array to be fan filtered. The reproducing heads for traces 8 and 9 close to the center reference position 39, are connected together and to a playback amplifier 53a, and thence to an attenuator 54a and a delay line 55a. The amplified and attenuated signals traversing the delay line 55a are extracted at two different time-delay output points respectively connected by a lead 56a to a summation circuit 58 and by a lead 57a to a second summation circuit 59. Similarly, the heads reproducing the two traces 7 and 10, one sample-point interval further removed from reference position 39 than traces 8 and 9, are connected together and to a playback amplifier 53b, an attenuator 54b, and a delay line 55b, from which the signal is extracted at two time-spaced points by leads 56b and 57b respectively connected to summation circuits 58 and 59. In the same way, the next trace pairs 6, 11; 5, 12; 4, 13; and 3, 14 are respectively connected to the appropriate one of playback amplifiers 53c–53f, the corresponding one of attenuators 54c–54f and of delay lines 55c–55f. Corresponding time-spaced samples are taken from the delay lines by leads 56c–56f to summation circuit 58 and by leads 57c–57f to summation circuit 59. The output of circuit 59 is transmitted through an inverting amplifier 60 and combined with the output of summation circuit 58 at point 61, to produce at this point a difference or subtraction signal, which forms the input to a time-domain filter 62. The output of filter 62 is recorded as a trace on a display drum 65 by a recording element 64 driven by recording amplifier 63. A suitable mechanical connection from display drum 65 to constant-speed motor 51 maintains synchronism between it and drum 50, though the timing trace T may also be transferred from drum 50 to drum 65.

The system thus far described corresponds to the fan-pass filter operation described by Equation 15. Playback amplifiers 53a–53f are adjusted to provide equal and constant gain for the transmitted signals, while the attenuators 54a–54f introduce the weighting factors $1/\pi^2$ and $1/\mu$ of Equation 15. It may be recalled from FIG. 3 that $\mu$ has the value $\pm 1$ for traces 8 and 9 and therefore the calibrated attenuator 54a is adjusted to the value $1\pi^2$. For traces 7 and 10 the value of $\mu$ is $\pm 3$, and so the calibrated attenuator 54b is set to the value $1/3\pi^2$. Similarly, the values $\pm 5$, $\pm 7$, $\pm 9$ and $\pm 11$ for $\mu$ are utilized in setting calibrated attenuators 54c–54f to the values shown in the drawing.

The time indices of Equation 15, $n-\frac{1}{2}(\mu-1)$ and $n+\frac{1}{2}(\mu+1)$, are respectively represented by the upper and lower output-connection points of the delay lines 55a–55f. As the signals traverse the delay lines in the direction from left to right, it will be seen that the upper output-tap points represent the first term in the brackets of Equation 15

$$v_{n-\frac{1}{2}(\mu-1)}^{\mu}$$

which is thus an "early" sample since it always has a smaller time-index number, while the second bracketed term $$v_{n+\frac{1}{2}(\mu+1)}^{\mu}$$

is a "late" sample and is represented by the lower delay-line output taps, respectively connected through leads 57a–57f to summation circuit 59. The minus sign of the bracketed expression in Equation 15 is provided by inverting amplifier 60, so that at point 61 all of Equation 15 has been simulated except convolution with the time-domain filter $r_n^1$ defined by Equation 16 and exemplified in block form as element 62.

Figure 5:
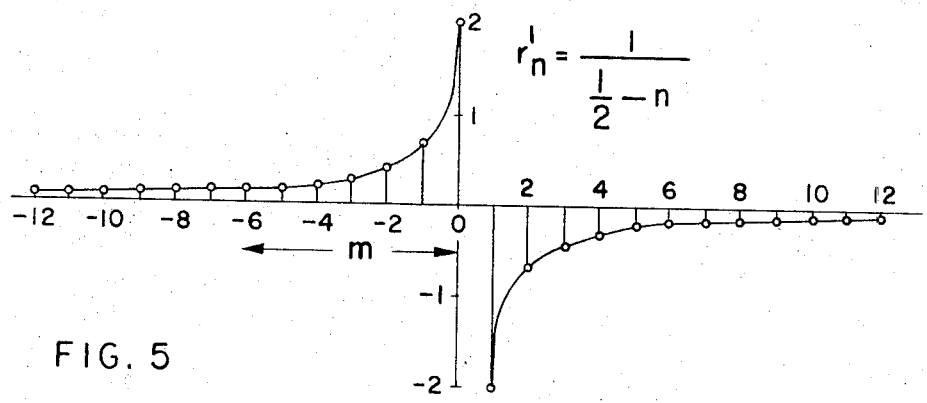
FIG. 5 is a graph showing the form of filter impulse response required in our invention.

FIG. 5 shows in graphical form the impulse response of filter 62. The vertical bars represent the amplitudes at the respective time points of the impulse response when the filter exists in digital form as in a digital computer, while the smooth curves connecting the end points of the vertical bars represent the analog form of this filter. One particularly convenient form of this filter is a lumped-constant, tapped delay line such as that shown in U.S. Pat. 2,980,871 Cox, for example.

In operation, with attenuators 54a–54f set to the values shown on the drawing, and the delay-line taps of lines 55a–55f spaced apart for the different trace pairs by desumming said last amplitude-adjusted reproduced traces with alternating positive and negative polarities, deriving from the output of said time-domain filter a function varying as said filter output but with the reverse polarity, and recording a trace which is the sum of said reverse-polarity function and said alternating-polarity adjusted-amplitude traces.

References Cited
UNITED STATES PATENTS

| | | | |
|---|---|---|---|
| 3,142,815 | 7/1964 | Picou | 340—15.5(C) |
| 3,274,541 | 9/1966 | Embree | 340—15.5(C) |
| 3,284,763 | 11/1966 | Burg et al. | 340—15.5 |

RODNEY D. BENNETT, Primary Examiner

D. C. KAUFMAN, Assistant Examiner